United States Patent [19]

Plummer

[11] 4,208,112
[45] Jun. 17, 1980

[54] PHOTOGRAPHIC CAMERA ACCESSORY

[75] Inventor: William T. Plummer, Concord, Mass.

[73] Assignee: Polaroid Corporation, Cambridge, Mass.

[21] Appl. No.: 45,062

[22] Filed: Jun. 4, 1979

[51] Int. Cl.² .............................................. G03B 7/08
[52] U.S. Cl. ..................................................... 354/42
[58] Field of Search .................................. 354/21–23, 354/28, 31, 38, 41, 42, 49, 43, 59, 79

[56] References Cited

U.S. PATENT DOCUMENTS

| | | | |
|---|---|---|---|
| 1,762,048 | 6/1930 | Camp | 354/22 |
| 2,000,425 | 5/1935 | Strauss | 354/42 |
| 3,120,161 | 2/1964 | Pickens et al. | 354/41 |
| 3,446,129 | 5/1969 | Burgarella | 354/32 |
| 3,518,926 | 7/1970 | Bing | 354/42 |
| 3,524,392 | 8/1970 | Langnau et al. | 354/21 |
| 3,685,424 | 8/1972 | Saul | 354/28 |
| 3,696,720 | 10/1972 | Vinson | 354/22 |
| 3,744,385 | 7/1973 | Burgarella et al. | 354/23 D X |
| 3,798,665 | 3/1974 | Eloranta et al. | 354/79 |
| 3,848,985 | 11/1974 | Bennett | 354/41 |
| 3,898,678 | 8/1975 | Walworth | 354/79 |
| 3,900,858 | 8/1975 | McCann et al. | 354/79 |
| 3,942,184 | 3/1976 | Blinow et al. | 354/42 |
| 3,999,195 | 12/1976 | Little | 354/79 X |
| 4,021,825 | 5/1977 | McCann et al. | 354/79 |
| 4,045,806 | 8/1977 | Ellin et al. | 354/38 X |

Primary Examiner—Donald A. Griffin
Attorney, Agent, or Firm—Francis J. Caufield

[57] ABSTRACT

A photographic camera accessory is provided by which a camera of the type having an automatic exposure control system designed to properly expose film having a given speed can be adapted for use with a film having a faster speed.

8 Claims, 4 Drawing Figures

PHOTOGRAPHIC CAMERA ACCESSORY

BACKGROUND OF THE INVENTION

1. Field of the Invention

This invention in general relates to photography and in particular to a camera accessory by which a camera of the type having an automatic exposure control system designed for use with a film with a given speed can be adapted for use with a film with a faster speed.

2. Description of the Prior Art

Photographic cameras of the type which include systems by which exposure of a film is automatically controlled in a predetermined manner are well-known in the prior art. In general, such exposure control systems usually consists of an electromechanical shutter arrangement which is controlled by the output of a scene brightness measuring system in such a way that aperture and/or shutter speed are set in accordance with a film's given ASA speed rating and what the scene brightness measuring system judges the "average" scene brightness to be.

Some camera automatic exposure control systems, such as those described, for example, in U.S. Pat. No. 3,446,129 issued to John P. Burgarella on May 27, 1969 and entitled "Exposure Control Apparatus For Photographic Camera"; U.S. Pat. No. 3,848,985 issued to Stewart Bennet on Nov. 19, 1974 and entitled "Automatic Exposure Control System"; and U.S. Pat. No. 4,045,806 issued to Seymour Ellin on Aug. 30, 1977 and entitled "Extended Range Exposure Control System", are structured to provide the camera with the capability of being used with a number of similarly packaged films having different speed ratings. In such "multi-speed" systems, a parameter of the exposure control system is modified either in response to a manual input by the photographer indicating what the speed of the film is or automatically by inserting a specially designed film container which is coded in such a way that the camera control system automatically recognizes what the speed of its film is.

However, other automatic exposure control systems, such as those described, for example, in U.S. Pat. No. 3,641,891 issued to John P. Burgarella on Feb. 15, 1972 and entitled "Exposure Control System"; U.S. Pat. No. 3,744,385 issued to John P. Burgarella et al. on July 10, 1973 and entitled "Control System For Photographic Apparatus"; and U.S. Pat. No. 3,975,744 issued to Bruce K. Johnson et al. on Aug. 17, 1976 and entitled "Automatic Exposure Control System", are designed for use with a single film to given speed and do not have any means by which they can be easily modified to accept a film with a speed rating other than the one for which they are designed except in a limited way through the use of exposure trim arrangements as explained below.

Exposure trim arrangements are well-known in the art and operate to provide a photographer with some discretionary control over the exposure delivered by an automatic exposure control system. Although automatic exposure control systems, whether of the single speed or multi-speed type, have remarkably good exposure performance for the majority of scene lighting conditions normally encountered in photographic work, certain types of scene lighting situations—particularly those termed "high contrast"—do exist which require an exposure which is different from the "average" which would normally be predicted by the automatic exposure control system scene brightness measuring system. Therefore, when an anomalous scene lighting situation, like a strongly back lit scene is encountered, the scene brightness measuring system will predict an "average" exposure which for back-lit conditions will be less than that necessary to capture the more important details of the scene. The effect of such underexposure usually causes the primary subject of the picture to be darker than desired.

Those skilled in the photographic arts have recognized that automatic exposure control systems have this peculiar problem in dealing with "high-contrast" lighting situations and have alleviated the problem by providing the aforementioned exposure "trim" arrangements by which a photographer can manually alter the response of the scene brightness measuring system and thus its output which, in turn, causes the film to be exposed either more or less than it would otherwise be if allowed to operate at its "average" or nominal setting. Thus, with these trim arrangements, such as those described in, for example, U.S. Pat. No. 3,832,721 issued to Irving Erlichman on Aug. 27, 1974 and entitled "Lockout Mechanism For Automatic Trim Assembly Return Mechanism" and U.S. Pat. No. 4,007,468 issued to Igor Blinow et al. on Feb 8, 1977 and entitled "Trim Control Apparatus For Photographic Control System", the photographer is provided with a degree of discretionary control over what the exposure will be and can exercise it according to his personal preference and judgment regarding how much departure from the "average" setting is required for the particular scene being photographed.

While the aforementioned manual "trim" arrangements and other which are functionally similar allow for a degree of personal control over exposure to accommodate the anomalous scene lighting condition, such trim arrangements generally could not be used in the "single speed" type automatic exposure control system to modify the response of its scene brightness measuring system in such a way that the "single-speed" system could be used with another film whose speed is different from that for which the system was designed. This is true for two reasons. First, the range of exposure control for such trim mechanisms is generally on the order of plus or minus one to one and a half stops, and if the film whose speed is different from that for which the single-speed system is designed has a speed which falls outside of this exposure control range of the trim mechanism, the trim mechanism becomes useless for purposes of accommodating the different speed film. And secondly, even if the different speed film does come within the exposure control range of the trim mechanism, to use the trim mechanism would defeat its purpose. In other words, the trim mechanism might be used to accommodate a different speed film in the "single-speed" exposure control system, but if this were done, there would be no means for accommodating proper exposure for the anomalous scene lighting situation.

One known simple solution for adapting a "single-speed" exposure control system for use with a film whose speed is slower than that for which the system is designed is to simply place a neutral density filter over the scene brightness measuring system to cause it to increase exposure for a given brightness. However, no such technique is known by which a faster speed film can be used with the "single-speed" exposure control system, and it is therefore a primary object of this invention to provide a solution to this problem.

It is another object of this invention to provide a camera accessory by which a camera having an automatic exposure control system which is designed for use with a film of given speed can easily be adapted for use with a film of faster speed.

Other objects of the invention will in part appear hereinafter. The invention accordingly comprises the apparatus possessing the construction, the combination of elements, and arrangement of parts which are exemplified in the following detailed disclosure.

SUMMARY OF THE INVENTION

This invention in general relates to photography and in particular to a photographic camera accessory for adapting a camera for use with a film having a speed faster than the speed of the film for which the camera is designed.

The camera is of the type which has an exposure control system including means for automatically measuring scene brightness and regulating the amount of exposure received by the film so that the film is properly exposed for its given speed.

The accessory of the invention comprises light detecting means for receiving light from the scene and providing an output signal having an electrical characteristic which varies in a predetermined manner in accordance with scene brightness.

Also included in the invention are scene brightness simulating means which are structured to cooperate with the accessory light detecting means for providing to the camera scene brightness measuring means an artificial source of illumination having a simulated brightness which is always greater than the actual scene brightness by a predetermined factor which corresponds to the difference between the film speed for which the camera exposure control system is designed and the faster speed of the film with which the camera is used.

Whenever the accessory is operatively associated with the camera and the camera exposure control system is actuated, exposure is regulated in accordance with the simulated scene brightness rather than the actual scene brightness thereby causing a reduction in exposure.

The factor by which the simulated scene brightness and the actual scene brightness differ is selected so that the reduced exposure delivered by the camera is appropriate for the faster speed film.

DESCRIPTION OF THE DRAWINGS

The novel features that are considered characteristic of the invention are set forth with particularly in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figure 1:
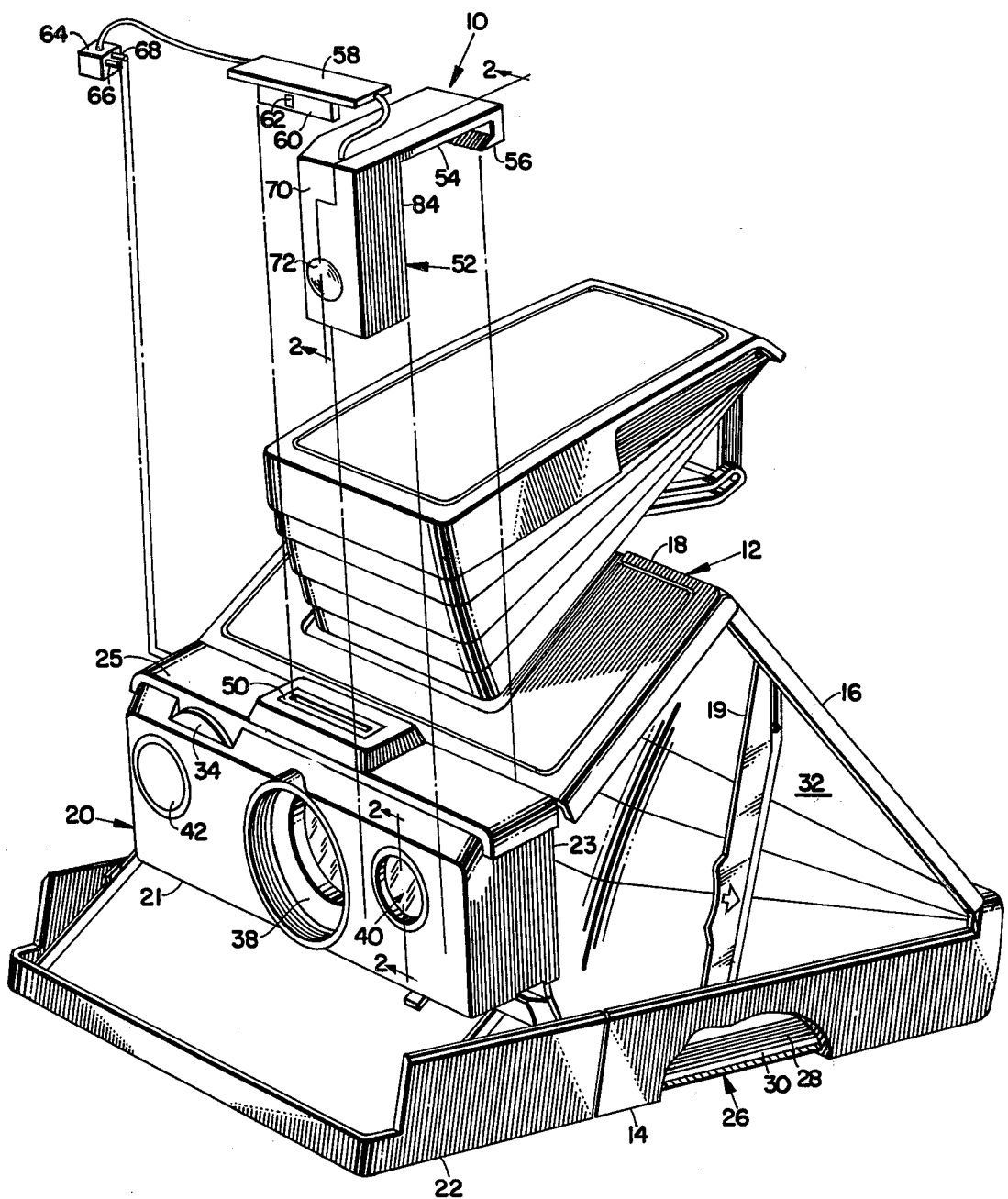
FIG. 1 is a perspective view showing the invention in combination with a camera, with parts broken away, with which the invention can be used.

Referring now to FIG. 1, there is shown a photographic camera accessory 10 which is the preferred embodiment of the present invention. Also shown is a camera 12 which is of the type with which the preferred embodiment of the present invention is particularly useful for adapting the camera 12 for use with a film having a speed greater than that for which it is designed.

The camera 12 may be generally characterized as a fully automatic, folding, reflex type which utilizes self-processable type film units. Camera 12 is provided in a well-known manner with a viewing and focusing mode of operation during which a photographer may compose and focus the subject matter that he selects for inclusion in the picture and an exposure and processing mode—which follows the viewing and focusing mode—during which a film unit is automatically exposed and thereafter processed in a well-known manner. Also, the camera 10 is provided with means by which it operates in two distinct exposure modes of operation which the photographer selects to suit his particular purposes. In one mode, an ambient exposure mode, the camera 10 operates to utilize available scene light for exposing a film unit and in another mode, a flash exposure mode of operation, the camera 10 utilizes an artificial light source (not shown), such as a linear photoflash lamp array or an electronic strobe, to illuminate the scene. In the flash exposure mode of operation, the light from the artificial source supplements the available scene light raising it to a level where the speed at which the camera automatic shutter operates is fast enough to eliminate blurred pictures which may result from camera motion.

The structural and operating features of the camera 12 are generally similar to those of the camera disclosed and described in considerable detail in U.S. Pat. No. 3,714,879 issued to Edwin H. Land et al. on Feb. 6, 1973 and entitled "Reflex Camera". Therefore, only those particular features of the camera 12 which are considered essential for an understanding of the present invention will be given, and for those which are identified as well-known, reference may be had to the above-mentioned U.S. Pat. No. 3,714,879 or to other U.S. patents which will be specifically identified where appropriate.

FIG. 1 illustrates the camera 12 in a fully-extended, operative condition wherein it can be seen that the camera 12 comprises a plurality of housing sections including a base housing section 14, a rear housing section 16, an upper housing section 18, and a shutter housing section 20 which are pivotally coupled together for relative movement with respect to one another. The four housing sections, 14–20, thus arranged, cooperate to form a four-sided articulated structure or support frame for supporting a film container and components of the camera's optical and exposure systems in a predetermined spatial arrangement when the camera 12 is erected as shown in FIG. 1. Structurally arranged in this manner, the four housing sections, 14–20, provide the camera 12 with a foldable housing which, in effect, operates as a four-bar linkage system that is geometrically configured to define a predetermined space between them when the camera 12 is erected and are further configured and arranged with respect to one another to provide the camera 12 with a compact folded shape (not shown) to facilitate its transport and storage.

The camera 12 is maintained in its fully-extended position in a well-known manner by the provision of an erecting link 19. The erecting link 19 locks the housing sections, 14–20, in their predetermined spatial relationship to preserve the geometric integrity of the camera 12 while in its extended position. The erecting link 19 can be manually moved in a well-known manner so as to interrupt the locking relationship between the housing sections, 14–20, in order to facilitate folding the camera 12.

An opaque flexible envelope 32 is secured to the housing sections, 14–20, cooperating with them in a well-known manner to define a light-tight exposure chamber for the camera 12.

The base housing section 14 is adapted in a well-known manner to receive and hold a film cassette 26 in position so that photosensitive film components contained therein can be exposed. The film cassette 26 is preferably of the type which includes a stacked array of self-processable type film units which have a given speed rating and which are designated generally at 28. Located in the base of the film cassette 26, underneath the stacked array of self-processable film units 28, is a rectangular, flat, thin battery 30 which can be used in a well-known manner to supply power to the various electrical components of the camera 12. An example of such a film cassette is disclosed and described in considerable detail in U.S. Pat. No. 3,872,487 issued to Nicholas Gold on Mar. 18, 1975 and entitled "Photographic Film Assemblage and Apparatus".

The shutter housing section 20 includes a forward wall 21 which normally faces the scene to be photographed when the camera 12 is held in its normal picture taking attitude, a rear wall 23 which is spaced from the forward wall 12 and normally faces the photographer, and a top wall 25 connecting the two walls, 21 and 23. The shutter housing section 20 operates to provide a protective enclosure in which are disposed various components of the camera optical and automatic exposure control systems.

Centrally disposed in the shutter housing forward wall 21 is an objective taking lens 38 which operates to direct image-forming rays from the scene into the camera exposure chamber. The objective taking lens 38 is a well-known variable focus type whose focal length can be adjusted by changing the axial air spacing between its components. This is accomplished in a well-known manner by manually rotating a focusing wheel 34 (FIG. 1) located to the left of the objective taking lens 38.

Figure 2:
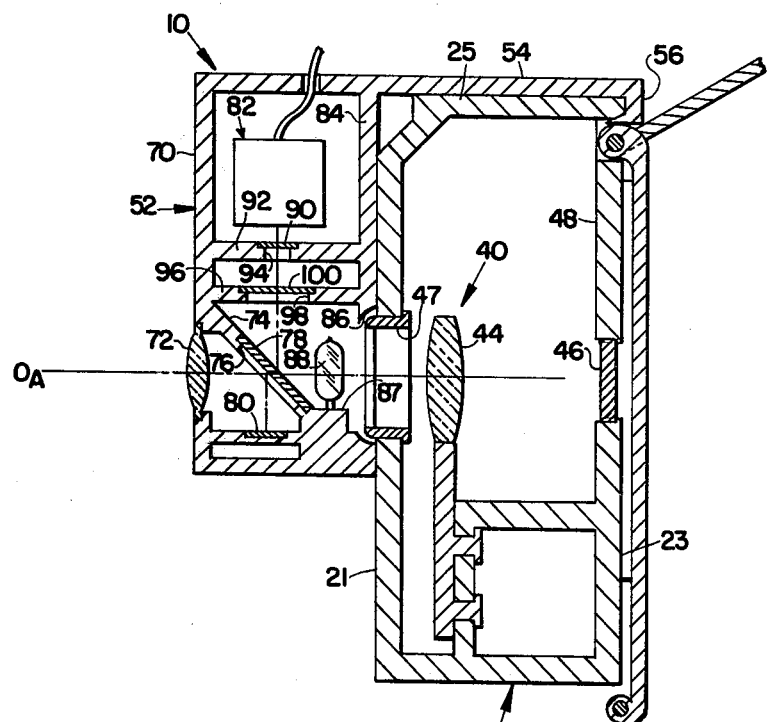
FIG. 2 is an enlarged, cross-sectioned, elevational view of the invention shown in combination with parts of the camera of FIG. 1 and taken generally along lines 2—2 of FIG. 1.

A photometer, which is generally designated at 40, is also included in the shutter housing section 20 for purposes of evaluating the scene light or brightness level. As best shown in FIG. 2, the photometer 40 comprises a photodetector 46 ahead of which is disposed a lens 44 which is structured to gather light from the scene through an aperture 47 which is located in the shutter housing forward wall 21. Arranged in this manner, the lens 44 directs scene light onto the surface of the photodetector 46. The photodetector 46 in turn generates an output signal having an electrical characteristic which varies in accordance with the brightness of the scene.

The output signal of the photodetector 46 is utilized in a well-known manner to control an electro-mechanical shutter arrangement (not shown) in such a way that the film units 30 of the film cassette 26 are properly exposed for the particular scene brightness conditions and the given speed rating of the film units 30. The photometer 40 is of the type more fully described in, for example, U.S. Pat. No. 4,102,581 issued to William T. Plummer on July 25, 1978 and entitled "Unicell Photoelectric Photometer", and the electro-mechanical shutter arrangement which is not illustrated is of the type more fully described in previously-mentioned U.S. Pat. Nos. 3,744,385 and 3,975,744.

The camera 12 thus structured is of the type that is adapted to utilize a single film of given speed and which has an exposure control system which includes means for automatically measuring scene brightness and regulating the amount of exposure received by the film so that the film is properly exposed for its given speed and the scene brightness level is determined by the photometer 40. However, the camera 12 has no means by which it easily can be adapted for use with a film whose speed rating is faster than that for which it was designed.

Located in the shutter housing section top wall 25 is a flash socket 50 (FIG. 1) for receiving an artificial light source (not shown). The flash socket 50 operates in a well-known manner in cooperation with the camera automatic exposure control system to convert the camera 12 from its ambient exposure mode of operation into its flash exposure mode of operation in response to insertion of an artificial light source into the flash socket 50. Also, the flash socket 50 is provided in a well-known manner with a series of contacts (not shown) one of which is electrically connected with the negative terminal of the battery 30. Additionally provided in the camera shutter housing section 20, but not shown, is another socket which is adapted in a well-known manner to receive a complementary configured two-pronged plug by which the camera 12 may be remotely actuated and through which the positive terminal of the battery 30 is made accessible by inserting the plug therein.

The camera accessory 10 of the present invention as will best be understood from the description that follows, adapts the camera 12 for use, while in its ambient exposure mode of operation, with a film which has a speed faster than the speed of the film for which the camera 12 is designed.

In general terms, the camera accessory 10 adapts the camera 12 for use with the faster speed film through the use of a light amplifying arrangement which presents to the camera photometer 40 a simulated scene brightness level which is always greater than the actual ambient scene brightness level by a factor which corresponds to the difference between the faster speed film with which the camera 12 is used in combination with the accessory 10 and the speed of the film for which the camera 12 is designed. When the camera photometer 40 "sees" the higher simulated scene brightness, the camera automatic exposure control system reduces exposure by an amount which is selected in a manner to be described to correspond to the correct exposure for the faster speed film and the actual scene brightness level.

Referring now to FIG. 1, it can be seen that the camera accessory 10 comprises a housing 52 which has a beam section 54 extending rearwardly therefrom in cantilevered fashion. At the end of the cantilevered beam section 54 there is provided a hock-like section 56 (see FIG. 2) that is structured to engage the trailing edge of the camera shutter housing section top wall 25 so that the camera accessory 10 can be releasably attached to the shutter housing section 20 in such a way that a rear wall 84 of the accessory 10 overlies the camera photometer window or aperture 47 for reasons which will become apparent hereinafter.

The camera accessory 10 is also preferably provided with means by which power is derived from the battery 30 via the camera's flash socket 50 and the camera remote switch socket (not shown) previously described to supply electrical energy to its various internal elements to be described. These means comprise a plug 58 which includes an elongated blade section 60 (FIG. 1) depending downwardly therefrom and structured to fit into the camera flash socket 50. A contact 62 is provided on the elongated blade 60 so that, when the plug 58 is inserted into the socket 50, the contact 62 becomes electrically engaged with a corresponding contact in the socket 50 which is connected to the negative terminal of the battery 30. Also included is a plug 64 which has a pair of spaced apart prongs, 66 and 68, which are configured to fit into the camera remote switch socket (not shown) and engage corresponding contacts therein one of which electrically connects with the positive terminal of the battery 30 in a well-known manner.

In the foregoing manner the camera accessory 10 can be easily releasably attached with the camera shutter housing 20 and electrically connected with the battery 30 via the plugs 58 and 64. Also, the power may be turned on or off by a suitable switch (not shown).

Referring now to FIG. 2, which illustrates the camera accessory 10 coupled with the camera shutter housing sectin 20, it can be seen that the camera accesory housing 52 comprises a forward wall section 70 which faces the photographic scene when the accessory 10 is attached to the camera shutter housing 20. Disposed in the lower end of the forward wall 70 is an optical element in the form of a positive lens 72 that is structured in a well-known manner to collect light from the scene to be photographed and direct it along an optical axis, OA, thereof. Behind the lens 72 there is positioned a two-sided opaque mirror 78 which is located in overlying relationship to an aperture 76 in a diagonal wall 74. The front surface of the mirror 78 intercepts light emerging from the rear surface of the lens 72 and directs it along a folded optical path towards a photodetector 80. The photodetector 80 is preferably a silicon photodiode which forms part of an electronic control circuit 82 which is physically located in an upper portion of the camera accessory housing 52 and which is illustrated in the schematic diagram of FIG. 3.

The photodetector 80 has its cathode connected to the positive side of the battery 30 (see FIG. 3) and its anode connected to the negative terminal of a conventional differential amplifier 102. Connected in this manner, the photodetector 80 operates in a reverse biased mode in a well-known manner to provide an output signal in the form of a current which varies in a predetermined manner in accordance with the scene brightness as seen through the lens 72. In the foregoing manner, the camera accessory 10 is provided with a first light detecting means for receiving light from the scene and providing an output signal having an electrical characteristic which varies in a predetermined manner in accordance with actual scene brightness. The photodetector 80, the lens 72, and the mirror 78 are preferably structured to simulate the camera photometer 40 so as to determine the actual brightness of a scene in substantially the same manner as does the camera 12 via the photometer 40.

Provided in the camera accessory housing rear wall section 84 is an aperture 86 that automatically is positioned over the camera photometer aperture 47 when the accessory 10 is coupled with the shutter housing section 20 (see FIG. 2). Within the housing 52 there is provided a pedestal section 87 which includes a socket (not shown) for receiving an artificial light source in the form of a small, preferably frosted incandescent lamp 88. The lamp 88 is of the type which has a continuous output whose intensity varies in accordance with the amount of power applied to it and is arranged in the foregoing manner so that at least part of the light output from it is aimed at the camera photometer 40 via the camera accessory rear wall aperture 47 to provide to the camera photometer 40 in a manner to be described a simulated scene brightness which is always higher than the actual scene brightness by a factor which corresponds to the difference between the faster speed film with which the camera 12 is used in combination with the accessory 10 and the speed of the film for which the camera 12 is designed.

Figure 3:
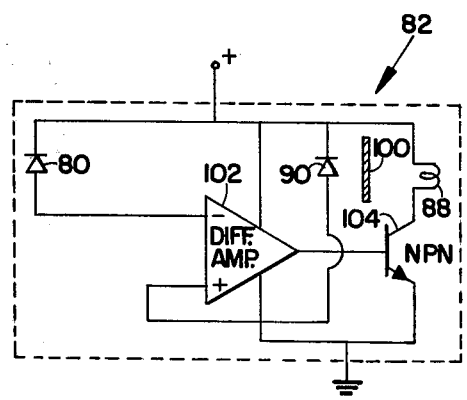
FIG. 3 is a schematic diagram of a circuit which forms part of the invention.

As best seen in FIG. 3, one terminal of lamp 88 is connected to the positive terminal of the battery 30 while the other terminal of the lamp 88 is connected to the collector of a conventional NPN transistor 104.

While part of the light from the lamp 88 passes through the aperture 86 into the camera photometer 40, it can be seen from FIG. 2 that part of the output of the lamp 88 is also directed along the optical axis, OA, toward the rear surface of the mirror 78 from which it is reflected to travel along a folded optical path toward the upper regions of the camera accessory housing 52.

The light from the lamp 88 traveling upwardly from the rear surface of the mirror 78 first passes through an aperture 98 located in an intermediate wall section 96 and thereafter travels toward an aperture 94 located in an upper wall section 92. Overlying the upper wall section aperture 94 is a second photodetector 90 which is also preferably of the silicon photodiode type connected in a reverse biased manner with its cathode in common with the positive terminal of the battery 30 while its anode provides the input to the positive side of the differential amplifier 102 as best shown in FIG. 3. In the foregoing manner, the accessory 10 is provided with a second light detecting means for receiving at least part of the light output of the lamp 88 and providing an output signal (a current) which has an electrical characteristic which varies in a predetermined manner in accordance with the intensity of light received thereby. The sensitivities of both the photodetector 80 and the photodetector 90 are preferably selected to be the same so that, when the photodetector 80 sees an actual scene brightness level of some value, the photodetector 90 will provide the same output, or nearly so, when it sees an equivalent brightness level.

As best shown in FIG. 2, a neutral density filter 100 is provided in overlying relationship to the aperture 98 and is thus arranged along the path over which light from the light source 88 travels from the rear surface of the mirror 78 to the photodetector 90. The purpose of the neutral density filter 100 is to reduce the intensity of the light from the light source 88 before reaching the photodetector 90. The density of the neutral density filter 100 is selected in a manner to be subsequently described.

The output from the differential amplifier 102, which is the difference between the inputs from the photodetectors 80 and 90, is connected in common with the base of the transistor 104. The emitter of the transistor 104 is connected to ground. With the foregoing arrangement the current flow through the lamp 88 is regulated in accordance with the output of the differential amplifier 102.

The manner in which the accessory 10 operates and the procedure to be followed in selecting the density of the neutral filter 100 will now be discussed keeping in mind that the purpose of the accessory 10 is to measure the actual scene brightness condition and to present to the camera scene brightness measuring means (the photometer 40) an artificial source of illumination which has a simulated brightness which is always greater than the acutal scene brightness by a predetermined factor which corresponds to the difference between the film speed for which the camera exposure control system is designed and the faster speed of the film with which the camera 12 is to be used so that when the camera exposure system is operated it regulates exposure in accordance with the simulated scene brightness created by the light source 88 rather than the actual scene brightness. As will be seen, this is accomplished by utilizing the output of the photodetector 90 in a feedback mode in combination with the other components of the circuit 82 to regulate the current flow through the lamp 88.

Referring again to FIG. 3, assuming that power is applied to the circuit 82 and recalling that the sensitivity of photodetectors 80 and 90 to incident light are identical or nearly so, it can be appreciated that for the lamp 88 to be generating an output, i.e. a simulated scene brightness to the camera photodetector 40, there must always be a net difference in the magnitude of the outputs from the photodetectors 80 and 90 to bias the transistor 104 on so that current will flow through the lamp 88. This means that the output from the differential amplifier 102 must always have a positive offset with the output of the photodetector 90 always being greater than that of the photodetector 80 which indicates the actual scene brightness. The neutral density filter 100, which is between the lamp 88 and the photodetector 90, assures that the foregoing circuit condition is always satisfied since it reduces the intensity of the simulated scene brightness as seen by the photodetector 90, i.e., the output of the photodetector 90 indicates that the simulated scene brightness is lower than it actually is as seen by the camera photometer 40—the lower amount being related to the density of the filter 100.

The density of the filter 100 is selected so that the simulated scene brightness is always higher than the actual scene brightness by a factor corresponding to the difference between the faster film to be used in the camera 12 and the speed of the film for which the camera exposure control system is designed but the density of the filter 100 expressed in stops is always less than the speed difference, expressed in stops, between the faster film and the speed for which the camera is designed. Otherwise there would be no net difference between the outputs of the photodetectors 80 and 90. An example will illustrate this. Suppose the faster speed film is two stops faster than the design film speed and the actual scene brightness is 100 candles/ft². Under these conditions, the simulated scene brightness would have to be 400 candles/ft² for the camera 12 to properly expose the faster speed film. If the filter density exactly reduced the intensity of the simulated scene brightness by two stops as seen by the photodetector 90, it would be providing an output exactly matching that of the photodetector 80 since the photodetector 90 will also be subjected to 100 candles/ft². Therefore, the output of the differential amplifier 102 would be zero and the lamp 88 would be turned off. To avoid this, the density of the filter (in stops) is therefore always selected to be less than the film speed difference (in stops) to provide the positive offset needed to drive the lamp 88.

The manner in which the density of the filter 100 is selected is preferably done experimentally by subjecting the photodetector 80 to a known scene brightness level and then selecting the density of the filter 100 while monitoring the simulated scene brightness so that the actual scene brightness and the simulated scene brightness differ by a factor corresponding to the difference in film speeds.

Figure 4:
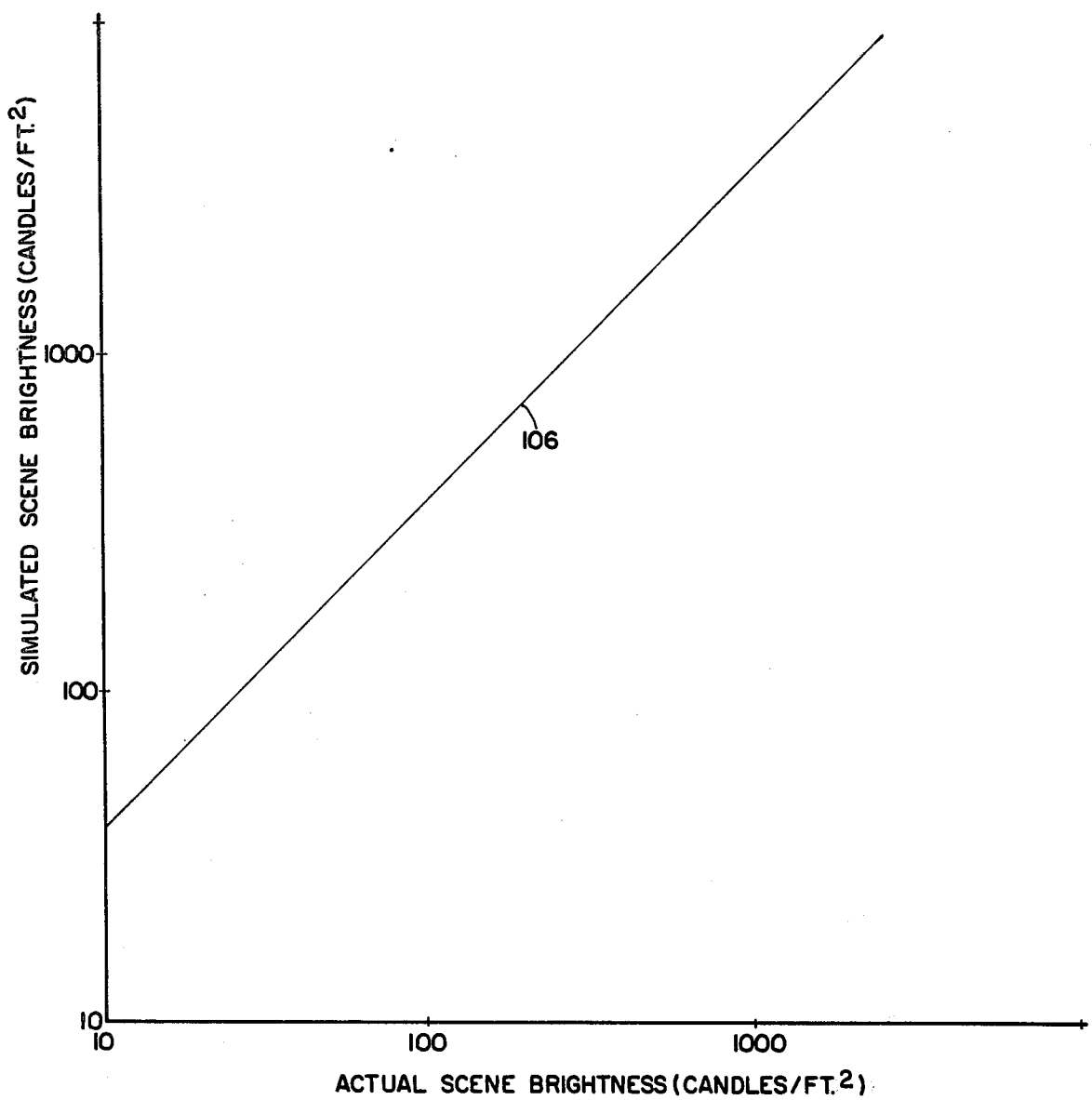
FIG. 4 is a graph which diagrammatically shows how simulated scene brightness provided by the invention varies in relation to actual scene brightness.

Curve 106 of FIG. 4 shows how the simulated scene brightness provided by the accessory 10 varies with actual scene brightness for a film whose speed is 2 stops faster than the design film speed. From the curve 106, it can be seen that the simulated scene brightness is always higher than the actual scene brightness by a factor of 4.

The detector 90 is also provided with a suitable IR cutofff filter (not shown) so that its spectral response closely matches the spectral response of the camera photometer 40.

The primary advantage of utilizing the output of the photodetector 90 in the feedback manner described above to control the output of the lamp 88 is that voltage variations and lamp aging, which influence the output of the lamp 88, are automatically compensated for.

Certain changes may be made in the above-described embodiment without departing from the scope of the invention. For example, the neutral density filter 100 can be eliminated if the sensitivity of the photodetector 90 is selected to be higher than that of the photodetector 80 so as to satisfy the condition that the output of the differential amplifier 102 always has the positive offset required to drive the lamp 88. Also, a variable aperture could be used instead of the neutral density filter 100 to reduce the intensity of the lamp 88 as seen by the photodetector 90.

Those skilled in the art may yet make other changes according to the teachings of the invention. Therefore, it is intended that all matter contained in the above description or shown in the accompanying drawings will be interpreted as illustrative and not in a limiting sense.

What is claimed is:

1. A photographic camera accessory for adapting a camera for use with a film having a speed faster than the speed of the film for which the camera is designed wherein the camera is of the type which has an exposure control system including means for automatically measuring scene brightness and regulating the amount of exposure received by the film so that the film is properly exposed for its given speed, said accessory comprising:

light detecting means for receiving light from the scene and providing an output signal having an electrical characteristic which varies in a predetermined manner in accordance with scene brightness; and scene brightness simulating means structured to cooperate with said light detecting means for providing to the camera scene brightness measuring means an artificial source of illumination having a simulated brightness which is always greater than the actual scene brightness by a predetermined factor which corresponds to the difference between the film speed for which the camera exposure control system is designed and the faster speed of the film with which the camera is used so that the camera exposure control system, when operative, regulates exposure in accordance with the simulated scene brightness rather than the actual scene brightness thereby reducing exposure whenever said accessory is operatively associated with the camera, said factor being selected so that the reduced exposure delivered by the camera is appropriate for the faster speed film.

2. The accessory of claim 1 wherein said light detecting means is structured to simulate the camera means for measuring scene brightness so as to determine the actual brightness of a scene in substantially the same manner as does the camera.

3. The accessory of claim 1 wherein said scene brightness simulating means comprises:
   (a) an artificial light source having a continuous output whose intensity varies in accordance with the amount of power to said source, said source being arranged so that at least part of the light output from it is aimed at the camera scene brightness measuring means when said accessory is operatively associated with the camera to provide said simulated scene brightness; and
   (b) means for receiving said light detecting means output signal and for regulating the power to said light source so that the simulated scene brightness provided by said light source is always greater than the actual scene brightness by said predetermined factor.

4. A photographic camera accessory for adapting a camera for use with a film having a speed faster than the speed of the film for which the camera is designed wherein the camera is of the type which has an exposure control system including means for automatically measuring scene brightness and regulating the amount of exposure received by the film so that the film is properly exposed for its given speed, said accessory comprising:
   first light detecting means for receiving light from the scene and providing an output signal having an electrical characteristic which varies in a predetermined manner in accordance with scene brightness;
   an artificial light source having a continuous output whose intensity varies in accordance with the amount of power to said source, said source being arranged so that at least part of the light output from it is aimed at the camera scene brightness measuring means when said accessory is operatively associated with the camera to provide to the camera scene brightness measuring means a simulated scene brightness;
   second light detecting means for receiving at least part of said light source output and providing an output signal having an electrical characteristic which varies in a predetermined manner in accordance with the intensity of the light received thereby; and
   means for receiving the output signals of both said first light detecting means and said second light detecting means and regulating the power to said light source so that said simulated scene brightness is always greater than the actual scene brightness by a predetermined factor which corresponds to the difference between the film speed for which the camera is designed and the faster speed of the film with which the camera is used in combination with said accessory so that the camera exposure control system, when operative, regulates exposure in accordance with the simulated scene brightness rather than the actual scene brightness thereby reducing exposure by said predetermined factor such that the reduced exposure is appropriate for the faster speed film.

5. The accessory of claim 4 wherein said first light detecting means is structured to simulate the camera means for measuring scene brightness so as to determine the actual brightness of a scene in substantially the same manner as does the camera.

6. The accessory of claim 4 wherein said last stated means comprise:
   (a) a differential amplifier for receiving said output signals of said first light detecting means and said second light detecting means and generating an output signal which varies in accordance with the difference between said first and second light detecting means output signals,
   (b) means for assuring that said output siganls always differ in a predetermined manner such that said difference signal from said differential amplifier varies in accordance with an offset factor related to the difference between the actual scene brightness and said simulated scene brightness; and
   (c) means responsive to said difference signal from said differential amplifier for regulating the power to said light source such that the intensity of said light source varies in accordance with said difference signal.

7. The accessory of claim 6 wherein said second light detecting means comprises a photodetector for providing said output signal and wherein said means for assuring that said output signals differ by said offset factor comprises a neutral density filter arranged between said light source and said photodetector and whose density is selected to reduce the intensity of said light source as seen by said photodetector so that said simulated brightness provided thereby always appears to said photodetector to be less than it actually is by said offset factor.

8. The accessory of claim 4 further comprising a housing structured to releasably attach to the camera and wherein all of said accessory means are disposed in said housing.

* * * * *